(No Model.)
D. DONAHUE.
STEAM BOILER.
No. 479,252. Patented July 19, 1892.
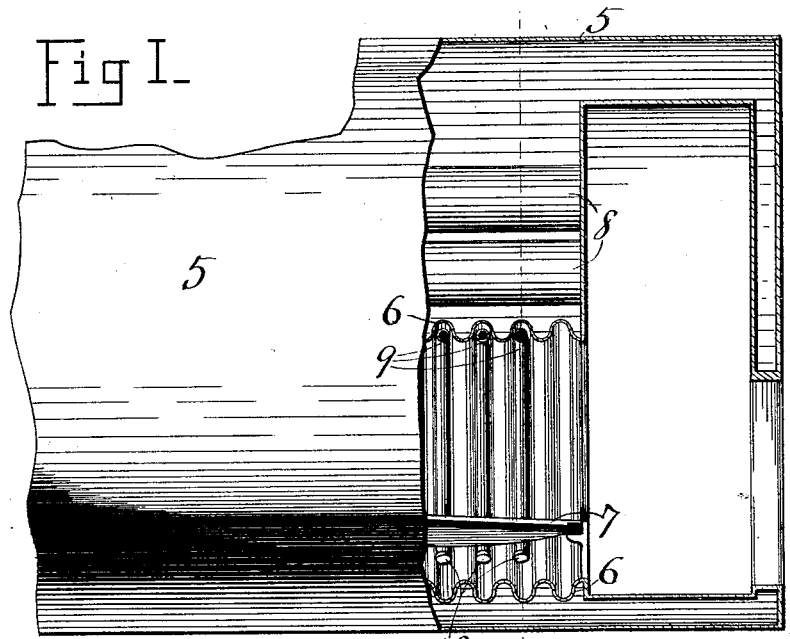
Fig I.
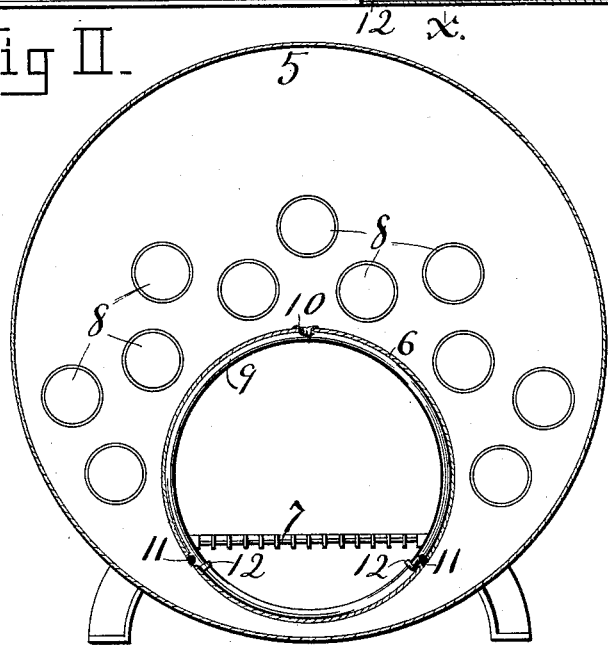
Fig II.
WITNESSES.
P. E. Stevens.
M. C. Hillyard.
INVENTOR
Daniel Donahue.
by W. C. Stevens, Attorney.
THE NORRIS PETERS CO., PHOTO-LITHO., WASHINGTON, D. C.

United States Patent Office.

DANIEL DONAHUE, OF NEW YORK, N. Y.

STEAM-BOILER.

SPECIFICATION forming part of Letters Patent No. 479,252, dated July 19, 1892.

Application filed March 5, 1892. Serial No. 423,860. (No model.)

*To all whom it may concern:*

Be it known that I, DANIEL DONAHUE, a citizen of the United States, residing at New York, in the county of New York and State of New York, have invented certain new and useful Improvements in Steam-Boilers; and I do hereby declare the following to be a full, clear, and exact description of the invention, such as will enable others skilled in the art to which it appertains to make and use the same.

This invention relates to that class of steam-boilers which have corrugated surfaces exposed directly to the heat of the furnace, either as an arch over and at the sides of the furnace or as a flue leading therefrom; and its object is to increase the heating-surface of such boilers and to induce perfect circulation of water therein.

To this end my invention consists in the construction and combination of parts forming a steam-boiler, hereinafter described and claimed, reference being had to the accompanying drawings, in which—

Figure I is a longitudinal vertical section, a little forward of a central line, of a portion of a steam-boiler according to my invention. Fig. II is a transverse vertical section at line x of Fig. I.

5 represents the exterior shell of the boiler, which is preferably made to completely surround the furnace in a manner common to some marine boilers. 6 is the inner shell of the boiler, circumferentially fluted where it forms the wall of the furnace. 7 is the fire-grate, and 8 represents a series of flues; but the features thus far named are all common.

9 represents a series of pipes, each of which I connect with the boiler at the top 10 of the arch and below the fire-grate at 11, and I locate these pipes in the flutings or corrugations of the boiler on the outside of its shell and within the furnace, for three reasons: First, when two surfaces to be heated are located close together, so as to form a passageway for a thin current of air between them, a larger percentage of heat is obtained than if the two surfaces are far apart; second, the pipes thus located between or within the corrugations are protected from injury by the stoker in charging and working the furnace, this point being more important on account of the liability of pipes to become leaky at their connection with the boiler if they are pounded or strained when hot, and, third, because the direct heating-surface is much increased thereby. Furthermore, these pipes, being exposed to the most intense heat of the furnace, will heat the small amount of water in them more rapidly than the whole volume of water in the boiler can be heated, and by being connected at one end of each with the boiler above the furnace and at the other end with the boiler below the furnace a rapid circulation is produced between these points, whereby the water, which is usually undisturbed under the furnace, will be kept in motion, thus equalizing the temperature between the bottom and other parts of the boiler.

It is evident that the same idea may be further carried out by locating water-pipes in the grooves of flues, which are corrugated.

12 represents caps upon the pipes, which caps may be removed for the purpose of cleaning the pipes.

Having thus fully described my invention, what I believe to be new, and desire to secure by Letters Patent, is the following:

The combination, in a steam-boiler, of a corrugated shell and water-pipes located between the corrugations and connected with the boiler, substantially as described.

In testimony whereof I affix my signature in presence of two witnesses.

DANIEL DONAHUE.

Witnesses:
W. J. KERNAHAN,
JAMES LAWLESS.